No. 731,432.

Patented June 23, 1903.

UNITED STATES PATENT OFFICE.

WALTER COLE, OF MONTREAL, CANADA.

PROCESS OF MAKING CHEESE.

SPECIFICATION forming part of Letters Patent No. 731,432, dated June 23, 1903.

Application filed September 8, 1902. Serial No. 122,551. (No specimens.)

*To all whom it may concern:*

Be it known that I, WALTER COLE, a subject of His Majesty the King of Great Britain and Ireland, and a resident of the city of Montreal, in the Province of Quebec, in the Dominion of Canada, have invented certain new and useful Improvements in Processes of Making Cheese, of which the following is a full, clear, and exact specification.

My invention relates to cheese-making, and has for its object an improved method of treating the milk in preparing the curd.

The objects of my invention are to dispense with the use of rennet to produce a more perfect curd.

The method of treatment is as follows: A partial separation of the milk is made either by letting the milk stand for a few hours—say twelve or more—or by a short treatment in a separator. About ten per cent. of the milk is thus separated from the main bulk. This portion contains those constituents of the milk which are necessary for the process as well as a portion of the butter fat. This portion is then acidified, either naturally by allowing it to turn sour or by the addition of any of the well-known reagents. It is then thoroughly oxidized by passing air through it for from fifteen to thirty minutes. A normal temperature should be maintained during the acidifying and oxidizing processes. I have found from experience that temperatures ranging from 60° to 80° Fahrenheit are most effective and that twenty-five minutes oxidation obtains best results. By the time a change is observed in the condition of this portion a division occurs. The lighter constituents, including a portion of the butter fat, rise to the top, and the process of oxidizing must thereupon cease. The treated portion is then mixed with the other portion, and the whole is allowed to stand for over twelve hours. When the acidification is by natural process—*i. e.*, allowing the separated portion to stand until sour, which may take several days—this portion after oxidizing by aeration may be added to the main bulk of freshly-separated milk. This effects a saving in plant and makes the process continuous. The whey is then drained off, and the curd is then treated in the usual methods of cheese-making.

The process may be varied by removing the whole or a portion of the butter fat from the treated portion by any of the well-known methods before returning it to the main bulk.

By my process the milk removed with the butter fat, which is then acidified and oxidized and then returned to the main bulk, performs the function of rennet or other curding agent, and this dispenses with the use of that material, while at the same time it gives much better results in the forming of the curd and the final quality of the cheese.

What I claim as my invention, and desire to secure by Letters Patent, is—

1. The process of cheese-making, which consists in acidifying and then oxidizing by aeration a portion of the milk obtained by a partial separation, then mixing with the main bulk and separating the curd from the whey, as described.

2. The process of cheese-making, which consists in partially separating the milk, acidifying the portion containing the lighter constituents, oxidizing the said portion by aeration, adding the treated portion to the main bulk of the milk and separating the curd from the whey, as described.

3. The process of cheese-making, which consists in partially separating the milk, acidifying the portion containing the lighter constituents, oxidizing this portion by aeration, removing the butter fat therefrom, adding the remaining portion to the main bulk of the milk and separating the curd from the whey, as set forth.

4. The process of cheese-making, which consists in partially separating the milk, a portion of the lighter constituents about ten per cent. is then acidified, it is then oxidized by aeration for a period of fifteen to thirty minutes being retained at a normal temperature, the treated portion is then added to the main bulk and allowed to stand for over thirteen hours when the whey is then drawn off, the whole as herein described.

Signed by me at the city of Montreal, Province of Quebec, Dominion of Canada, this 5th day of September, 1902.

WALTER COLE.

Witnesses:
HANBURY A. BUDDEN,
A. A. CARON.